United States Patent
Chai et al.

(10) Patent No.: US 8,855,441 B2
(45) Date of Patent: *Oct. 7, 2014

(54) METHOD AND APPARATUS FOR TRANSFORMING A NON-LINEAR LENS-DISTORTED IMAGE

(71) Applicant: General Instrument Corporation, Horsham, PA (US)

(72) Inventors: Sek M. Chai, Streamwood, IL (US); Malcolm R. Dwyer, Glendale Heights, IL (US); Ruei-Sung Lin, Schaumburg, IL (US); Daniel A. Linzmeier, Wheeling, IL (US); Nikolas Bellas, Chicago, IL (US)

(73) Assignee: General Instrument Corporation, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,604

(22) Filed: Nov. 2, 2012

(65) Prior Publication Data

US 2013/0058589 A1 Mar. 7, 2013

Related U.S. Application Data

(63) Continuation of application No. 12/262,363, filed on Oct. 31, 2008, now Pat. No. 8,326,077.

(51) Int. Cl.
*G06K 9/40* (2006.01)
*G06T 5/00* (2006.01)
*G06T 3/00* (2006.01)
*H04N 1/387* (2006.01)

(52) U.S. Cl.
CPC .............. *G06T 5/006* (2013.01); *G06T 3/0018* (2013.01); *H04N 1/387* (2013.01)

USPC ........................................... 382/275; 382/255

(58) Field of Classification Search
USPC ............ 382/255, 274, 275, 284; 348/207.99, 348/36, 208.11, 224.1
See application file for complete search history.

(56) References Cited

U.S. PATENT DOCUMENTS 5,173,948 A * 12/1992 Blackham et al. ............. 382/293
5,185,667 A * 2/1993 Zimmermann .......... 348/207.99

(Continued)

OTHER PUBLICATIONS

E. Schwalbe, 'Geometric Modeling and Calibration of FishEye Lens Camera Systems' Proceedings of the ISPRS Working Group, Panoramic Photogrammetry Workshop, Berlin, Germany, Feb. 2005, ISBN 1682-1750, vol. 34-5/W8.

*Primary Examiner* — Samir Ahmed
(74) *Attorney, Agent, or Firm* — Stewart M. Wiener

(57) ABSTRACT

A method and apparatus for image processing a lens-distorted image (e.g., a fisheye image) is provided. The method includes partitioning coordinate points in a selected output image into tiles. The output image is an undistorted rendition of a subset of the lens-distorted image. Coordinate points on a border of the tiles in the output image are selected. For each tile, coordinate points in the lens-distorted image corresponding to each selected coordinate point in the output image are calculated. In addition, for each tile, a bounding box on the lens-distorted image is selected. The bounding box includes the calculated coordinates in the lens-distorted image. The bounding boxes are expanded so that they encompass all coordinate points in the lens-distorted image that map to all coordinate points in their respective corresponding tiles. Output pixel values are generated for each tile from pixel values in their corresponding expanded bounding boxes.

20 Claims, 7 Drawing Sheets

(56) References Cited

U.S. PATENT DOCUMENTS

| | | | |
|---|---|---|---|
| 5,359,363 A | 10/1994 | Kuban et al. | |
| 5,796,426 A * | 8/1998 | Gullichsen et al. | 348/207.99 |
| 6,005,611 A * | 12/1999 | Gullichsen et al. | 348/211.6 |
| 6,005,984 A * | 12/1999 | Kawakami et al. | 382/276 |
| 6,201,574 B1 | 3/2001 | Martin | |
| 6,243,131 B1 | 6/2001 | Martin | |
| 6,327,097 B1 * | 12/2001 | Rybczynski | 359/676 |
| 6,346,967 B1 * | 2/2002 | Gullichsen et al. | 348/207.99 |
| 6,466,254 B1 * | 10/2002 | Furlan et al. | 348/36 |
| 6,778,207 B1 | 8/2004 | Lee et al. | |
| 7,042,497 B2 * | 5/2006 | Gullichsen et al. | 348/207.99 |
| 2002/0172429 A1 * | 11/2002 | Boliek et al. | 382/240 |
| 2003/0039395 A1 * | 2/2003 | Rondinelli et al. | 382/232 |
| 2006/0187305 A1 | 8/2006 | Trivedi et al. | |

\* cited by examiner

METHOD AND APPARATUS FOR TRANSFORMING A NON-LINEAR LENS-DISTORTED IMAGE

FIELD OF THE INVENTION

The present invention relates to a method and apparatus for transforming a distorted wide angle field-of-view image into a non-distorted, normal perspective image at any orientation, rotation, and magnification within the field-of-view, which is electronically equivalent to a mechanical pan, tilt, zoom, and rotation camera viewing system.

BACKGROUND OF THE INVENTION

Camera viewing systems are utilized for a large variety of different purposes, including surveillance, inspection, security and remote sensing as well as mainstream applications such as consumer digital imaging and real time video conferencing. The majority of these systems use either a fixed-mount camera with a limited viewing field, or they utilize mechanical pan-and-tilt platforms and mechanized zoom lenses to orient the camera and magnify its image. While a mechanical solution may often be satisfactory when multiple camera orientations and different degrees of image magnification are required, the mechanical platform can be cumbersome, relatively unreliable because of the many moving parts it requires, and it can occupy a significant volume, making such a viewing system difficult to conceal or use in close quarters. As a result, several stationary cameras are often used to provide wide-angle viewing of a workspace.

More recently, camera viewing systems have been developed that perform the electronic equivalent of mechanical pan, tilt, zoom, and rotation functions without the need for moving mechanisms. One method of capturing a video image that can be electronically processed in this manner uses a wide-angle lens such as a fisheye lens. Fisheye lenses permit a large sector of the surrounding space to be imaged all at one time, but they produce a non-linear distorted image as a result. While ordinary rectilinear lenses map incoming light rays to a planar photosensitive surface, fisheye lenses map them to a spherical surface, which is capable of a much wider field of view. In fact, fisheye lenses may even encompass a field of view of 180°. By capturing a larger section of the surrounding space, a fisheye lens camera affords a wider horizontal and vertical viewing angle, provided that the distorted images on the spherical surface can be corrected and transformed in real time.

BRIEF DESCRIPTION OF THE DRAWINGS

FIG. 9b shows the coordinate points on the input image that correspond to the output image of the tile shown in FIG. 9a.

DETAILED DESCRIPTION

As detailed below, a wide-angle camera viewing system is provided that produces the equivalent of pan, tilt, and zoom functions by efficiently performing real-time distortion correction processes that can be implemented on an embedded processor, ASIC or FPGA.

Figure 1:
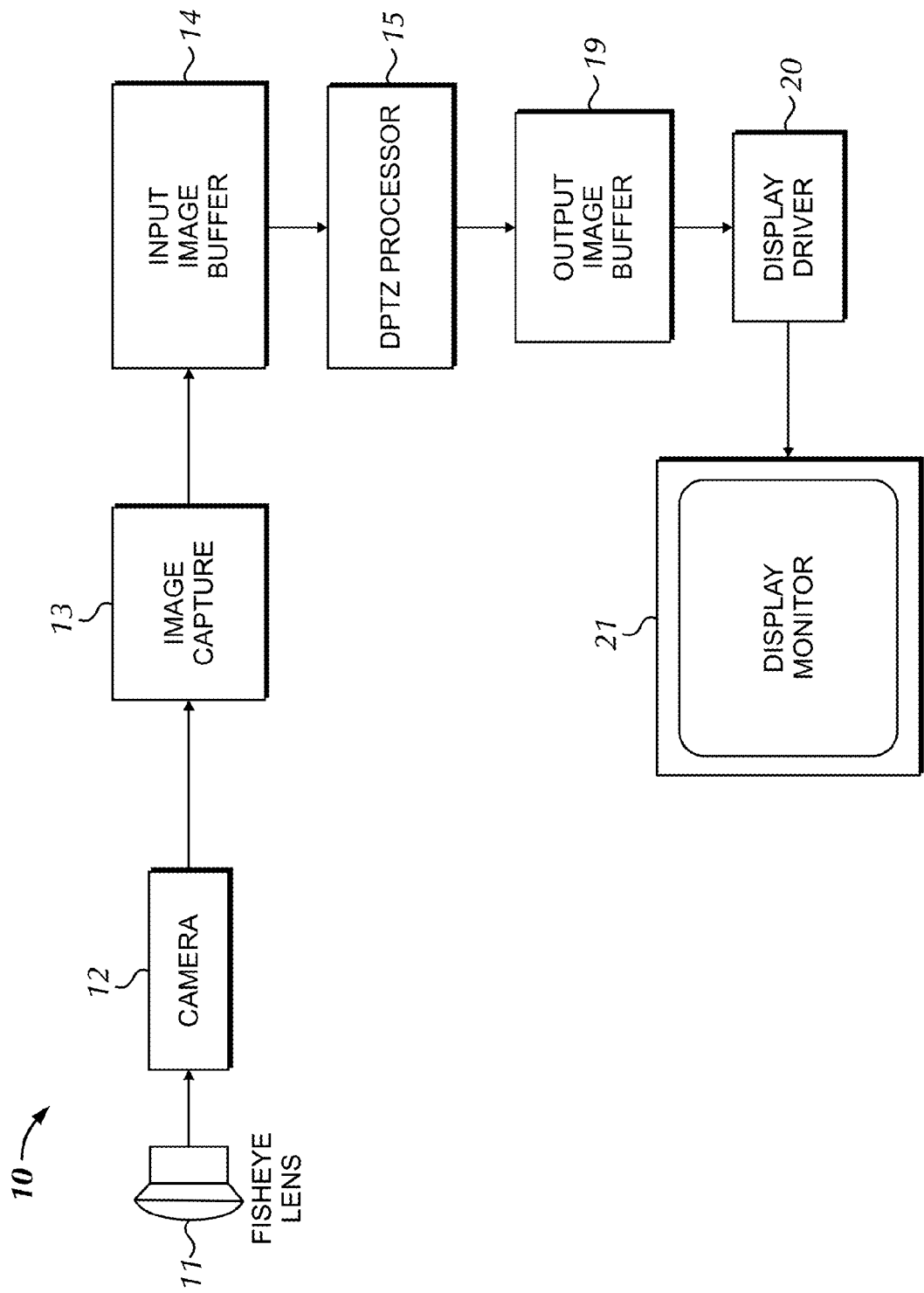
FIG. 1 shows a schematic diagram of a camera viewing system employing a fisheye lens.

The principles of image transform described herein can be understood by reference to the camera viewing system 10 of FIG. 1. Shown schematically at 11 is a wide angle, e.g., a fisheye, lens that provides an image of the environment with a wide angle field of view, e.g., a 180 degree field-of-view. The lens is attached to a camera 12 that converts the optical image into an electrical signal. If not already in a digital format, these signals are then digitized electronically by a digital image capture unit 13 and stored in an image buffer 14. A (Digital Pan Tilt Zoom) DPTZ processor 15 selects a portion of the input image captured by the wide angle lens 11 and then transforms that portion of the image to provide an output image with the proper perspective view. The portion of the input image that is selected will generally be selected by a user via a user interface (not shown) that is incorporated into the camera viewing system. The transformed output image is stored in an output image buffer 19. The output image buffer 19 is scanned out by a display driver 20 to a video display device 21 on which the output image may be viewed. In alternate examples, any or all of the aforementioned components of the camera system may be remotely located from one another, in which case data can be transferred among the components over a network.

As noted above, the DPTZ processor 15 shown in FIG. 1 transforms input images captured with the fisheye lens to output images that represent a perspective view. The perspective view represents how a traditional camera would have captured the image at a particular pan, tilt, and zoom setting. The processor 15 can be implemented on a single-chip, multiple chips or multiple electrical components. For example, various architectures can be used for the processor 15, including a dedicated or embedded processor, a single purpose processor, controller, application specific integrated circuit (ASIC), field-programmable gate array (FPGA) and so forth.

Figure 2:
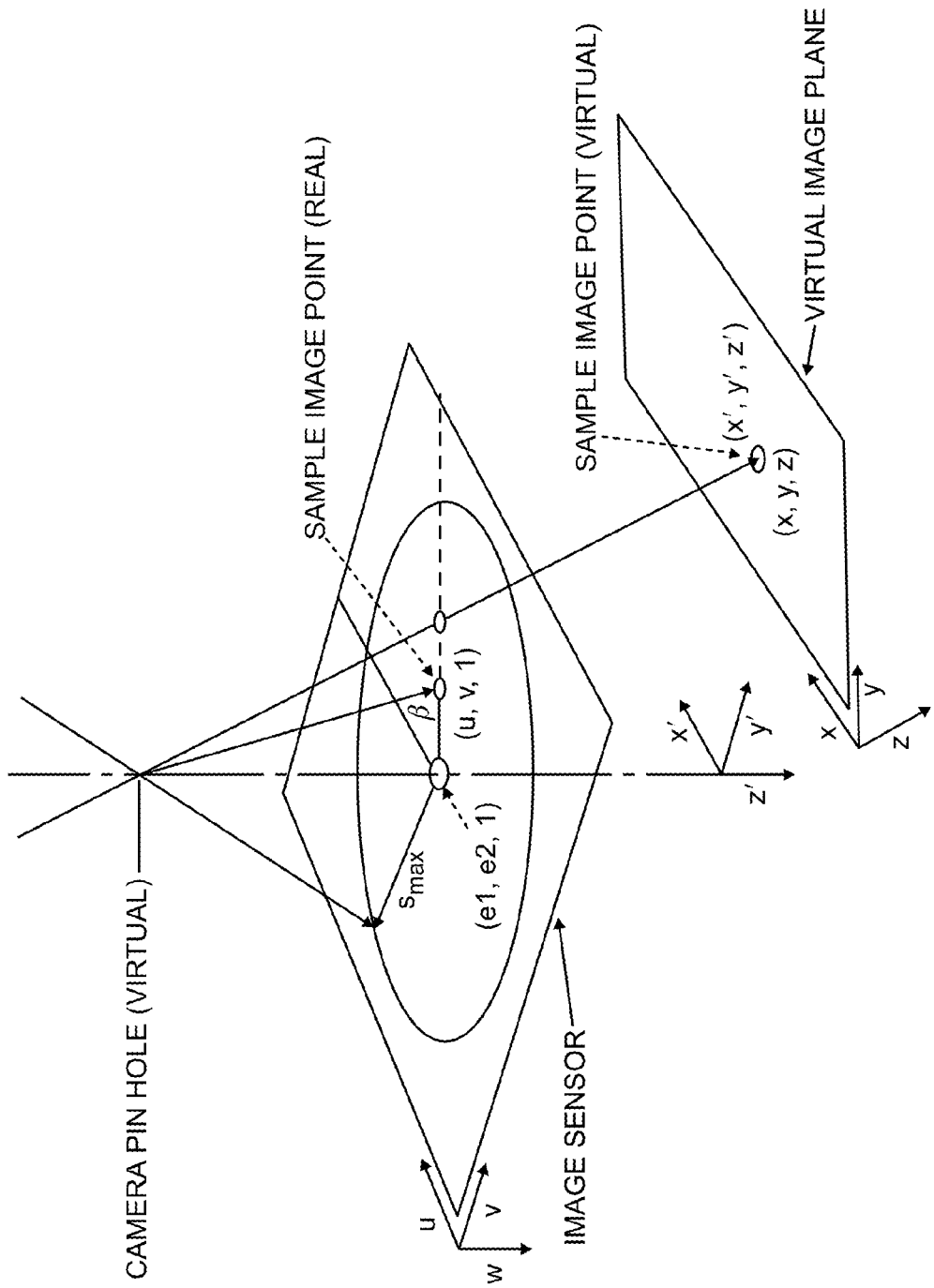
FIG. 2 illustrates the transformation between a desired output image and a captured input image that is projected onto an image sensor plane.

The transform between the desired output image and the captured input image can be modeled by first considering a standard pinhole camera. As illustrated in FIG. 2, light enters a pin hole and is imaged onto an image sensor plane. In a conventional camera that has mechanical pan, tilt and zoom capabilities, the sensor would be located on the image sensor plane. It would be mechanically panned and tilted to capture images at different viewing angles. The lens (or sensor) would be moved along the axis normal to the image sensor plane to zoom in or out.

The DPTZ processor 15 is used to construct the output image on the virtual image plane from the input image that is received on the image sensor plane. To do this, the virtual image plane is segmented into sample points. The sample points are mapped back onto the image sensor plane. The process of mapping (x,y) sample points in the virtual image plane back onto the image sensor (u,v) coordinates is called "inverse mapping." The translation of the (x,y,z) points in the output image are mapped to the (u,v,w=1) input image space by first translating to the (x, y, z') coordinate system, which is a scaled version of the (u,v) coordinate system:

$$\begin{bmatrix} x' \\ y' \\ z' \end{bmatrix} = H \begin{bmatrix} x \\ y \\ x \end{bmatrix}$$

Figure 3:
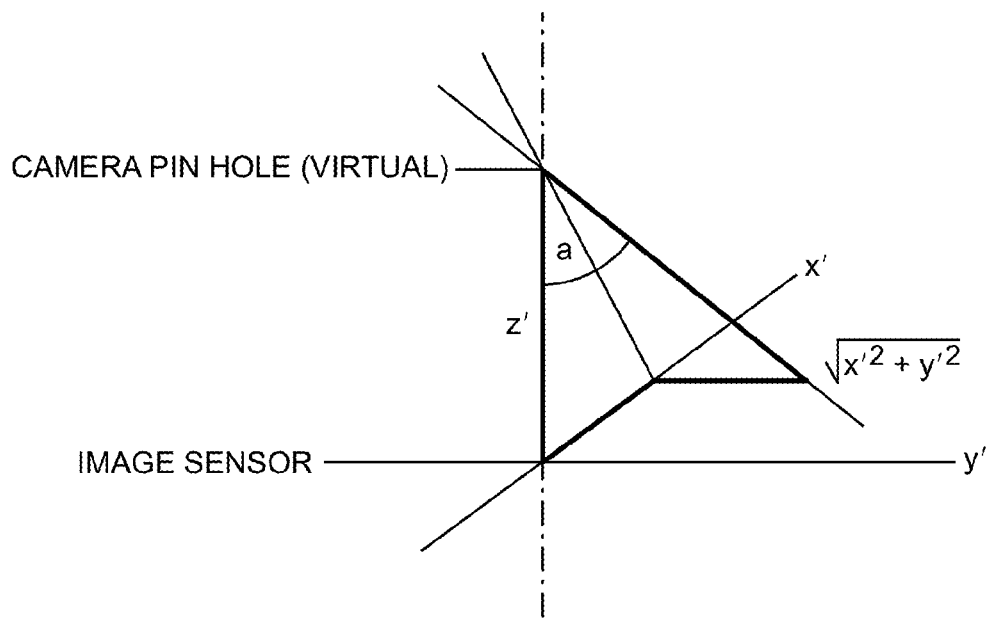
FIG. 3 shows the virtual image plane on which an output image is constructed by the DPTZ processor shown in FIG. 1.

As shown in FIG. 3, the effective incident angle (a) passing through the pixel at (x, y, z') is:

$$a = \arctan\left(\frac{\sqrt{x'^2 + y'^2}}{z'}\right)$$

The corrected radial distance is computed as:

$$s = k_1 a^4 + k_2 a^3 + k_3 a^2 + k_4 a^1 + k_5$$

Figure 4:
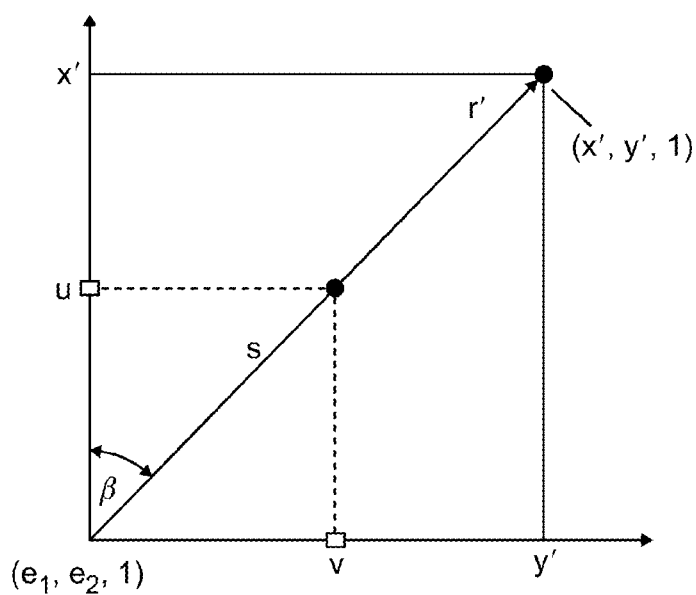
FIG. 4 illustrates an inverse mapping process in which sample points in the virtual image plane are translated to an image sensor coordinate system.

Referring to FIG. 4, since the original and translated center point coordinates are collinear, the angle β is maintained before and after mapping. The x' and y' coordinate components can be computed from the u and v coordinate since the ratio of s/r' is the same as αu/x' and Δv/y':

$$s/r' = (u - e_1)/x'$$

$$s/r' = (v - e_2)/y'$$

The final u and v coordinates in the image sensor plane are computed as:

$$u' = \frac{sx'}{\sqrt{x'^2 + y'^2}} + e1$$

$$v' = \frac{sy'}{\sqrt{x'^2 + y'^2}} + e2$$

Accordingly, the inverse mapping process in which mapping the (x,y) output image coordinates in the virtual image plane onto the (u,v) input image coordinates in the image sensor plane can be accomplished using the above equations.

Figure 5:
FIG. 5 shows an example of an input image that has been captured by a fisheye lens.
Figure 6A:
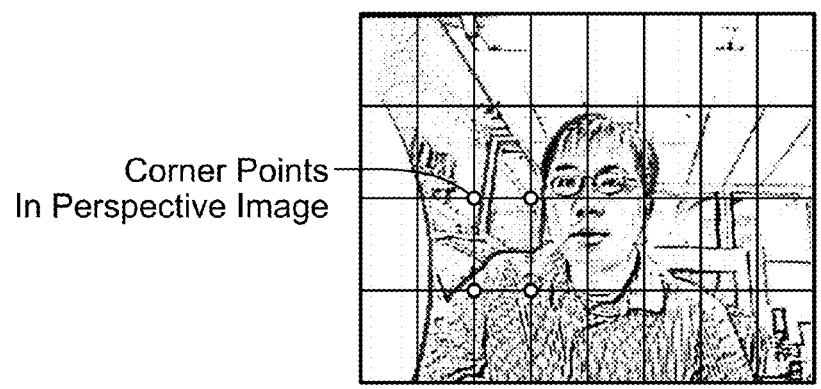
FIGS. 6a and 6b show two distortion-corrected output images that represent two different pan, tilt and zoom settings taken from the input image of FIG. 5.
Figure 6B:
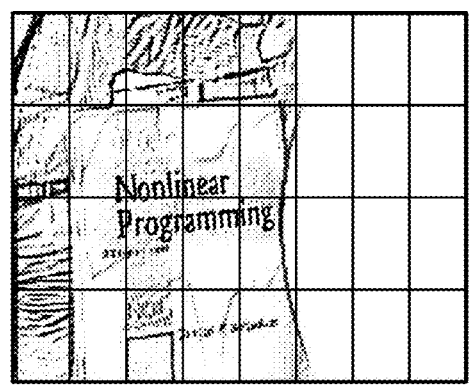

The manner in which inverse mapping is performed to create an output image from an input image will be described with reference to the images shown FIGS. 5 and 6 and the flowchart 200 of FIG. 7. FIG. 5 shows an example of an input image that has been captured by a fisheye lens. FIGS. 6a and 6b show two distortion-corrected output images that represent two different pan, tilt and zoom settings.

Figure 8:
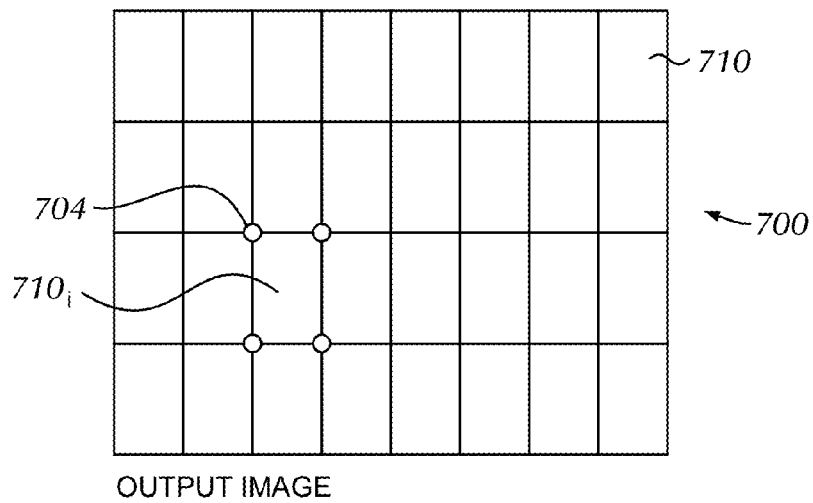
FIG. 8 shows the coordinate system of an output image that is divided into blocks.

Beginning with step 202, the coordinate points in a desired output image are partitioned into a series of blocks or tiles. For instance, FIG. 8 shows the coordinate system of an output image 700 that is divided into blocks 710. The size of each tile can be selected based on available on-chip memory, burst size of the memory controller, and the complexity of the memory access pattern used to generate the output for each tile. On-chip memory is used to store pixel data and intermediate values for each tile, and therefore, larger on-chip memory would allow for larger sized tiles. The output pixel can be transferred by burst transfer to memory, and for maximum efficiency, the number of columns in the tile can be selected to equal the data transferred in discrete numbers of burst transfers. For example, if a burst transfer can move 64 bytes of data, which is equivalent to 32 pixels, wherein each pixel is defined by one byte of luminance and one byte of chrominance value, then the tile should be sized such that there are increments of 32 pixels to maximally use the memory bandwidth of the burst transfer. Furthermore, the output image can be transferred such that the memory access pattern is deterministic and orderly to maximize the memory bandwidth.

Next, in step 204, coordinate points on the border of each tile are selected. For instance, in FIG. 8 the corner points 704 have been selected for tile $710_i$. In step 206, the corresponding coordinates in the input image are calculated. The corresponding coordinates correspond to each selected point on the tiles of the output image 700. For each tile, in step 208 a bounding box is defined on the input image which contains the corresponding coordinates.

Figure 9A:
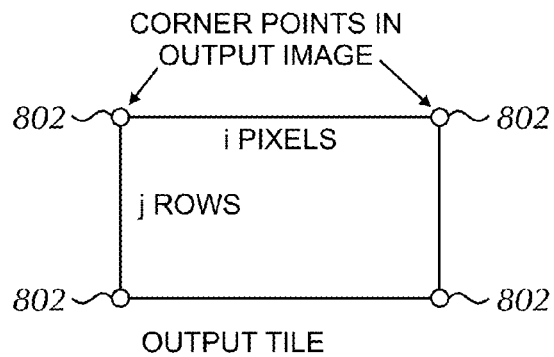
FIG. 9a shows a single tile in the output image of FIG. 8.
Figure 9B:
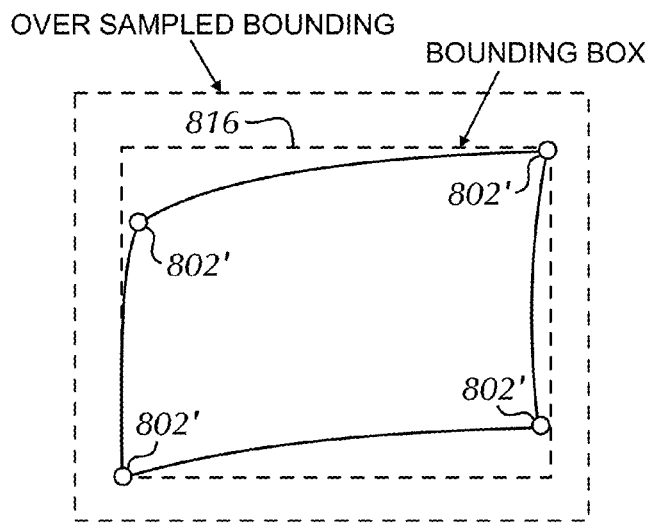

The manner in which the bounding box is defined in step 208 is described in more detail with reference to FIGS. 9a and 9b. FIG. 9a shows the (x,y) corner points 802 of a single tile on the output image. A single tile consists of a number of pixels arranged in i columns and j rows. FIG. 9b shows the corresponding (u,v) points 802' on the input image. The bounding box 810 is determined by first selecting the maximum and minimum u and v coordinate points from among the (u,v) points 802' and then connecting these maximum and minimum coordinate points to thereby define the bounding box 810. In this way the bounding box has a rectilinear shape while still encompassing all the (u,v) points 802'.

Figure 7:
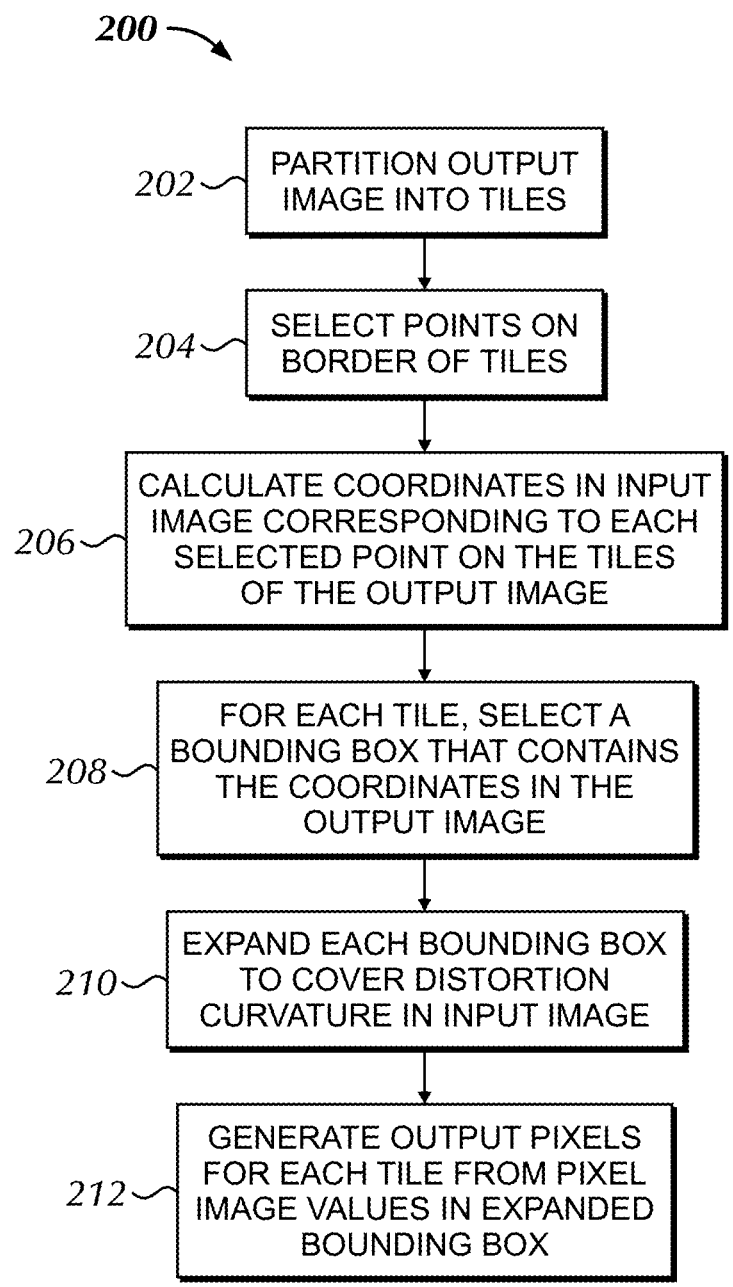
FIG. 7 is flowchart depicting an inverse mapping process.

Returning now to the flowchart of FIG. 7, after the bounding boxes has been determined in step 208, each bounding box is expanded in step 210, typically by a distance that corresponds to the width of a few pixels. The expanded bounding box 812 is shown in FIG. 9b. This expansion will often be necessary because lens distortion may otherwise prevent all the necessary pixel data from being available when performing interpolation (e.g. bi-cubic interpolation) and downsampling in step 212 to acquire the luminance and chrominance color pixel values at each of the (u,v) points in the bounding boxes. The manner in which the bounding box is expanded may be dependent on a wide variety of factors, including, for example, the location of each bounding box with respect to a center point in the input image from which the lens-distortion arises. In addition, it may be necessary to expand the bounding boxes if any of the (x,y) corner points 802 cross the x or y axis.

The expanding of bounding boxes can be dependent upon the filter size used in the image processing, available on-chip memory, the burst size of the memory controller, the complexity of a memory access pattern used to fetch pixel values from memory, and the location of the bounding box with respect to the center of distortion. Image processing can require pixel data in the neighborhood of the current processed pixel. The range of the neighborhood depends on the filter size used, and therefore, the bounding box can be expanded to account for the neighborhood pixels. On-chip memory is used to store pixel data and intermediate values for each tile, and therefore, larger on-chip memory would allow for larger sized bounding box. The input pixel can be transferred by burst transfer from memory, and for maximum efficiency, the number of columns in the bounding box can be selected to equal the data transferred in a discrete number of burst transfers. For example, if a burst transfer can move 64 bytes of data, which is equivalent to 32 pixels, wherein each pixel is defined by one byte of luminance and one byte of chrominance value, then the bounding box should be sized such that there are increments of 32 pixels to maximally use the memory bandwidth of the burst transfer. In addition, the image data in the bounding box can be transferred such that the memory access pattern is deterministic and orderly to maximize the memory bandwidth. Furthermore, the bounding box can be sized based on the non-linear distortion rate of the image. For example, an image captured by a fisheye lens would have the least amount of distortion at the center of the distortion. The bounding box can be sized larger to process and interpolate from a larger number of pixels for maximal image processing quality.

Finally, in step 212, output pixel values such as luminance and chrominance values are generated for each tile in the selected output image from the pixel values in each corresponding bounding box in the input image. Since it may be necessary to calculate pixel values for coordinate points located between individual pixels in the input image, an appropriate interpolation technique may be employed which is capable of approximating intermediate values of a continuous event given a series of sample points. While a variety of interpolation techniques such as nearest neighbor or bilinear interpolation techniques may be used, in many cases it will be advantageous to use bi-cubic interpolation because, despite being computationally expensive, it can often satisfy the peak signal to noise ratio (PSNR) requirements that may need to be met in order to ensure that high quality images are generated.

Generating the output pixel values for each tile in step 212 involves four or more discrete tasks. In particular, for each tile, the input image data first needs to be transferred to the DPTZ processor. Once the input image data is available to the processor, the tasks of inverse mapping, interpolation and filtering are performed on each tile. In order to increase throughput, in some cases it may be advantageous to pipeline these tasks so that each task executes simultaneously on a different tile. One example of a pipeline process that may be employed will be described with reference to the flowchart shown in FIG. 10. In this example, the tasks of transferring the image data and inverse mapping are executed on tile k, interpolation is performed on tile k+1, filtering is performed on tile k+2 and storage of the output pixel values are executed on tile k+3.

Figure 10:
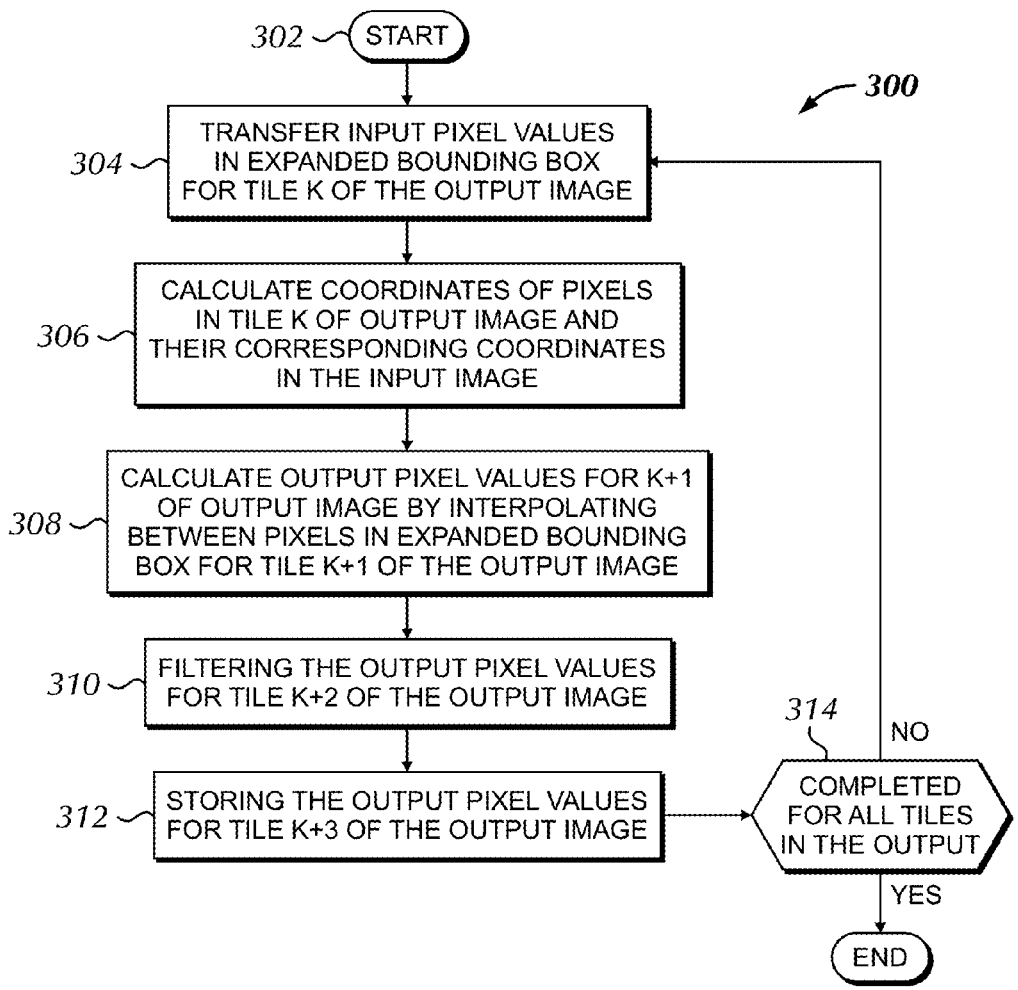
FIG. 10 is a flowchart depicted a pipelining process for generating output pixel values for the in which the tasks of transferring the image data and inverse mapping are executed on tile k, interpolation is performed on tile k+1, filtering is performed on tile k+2 and storage of the output pixel values are executed on tile k+3.

Referring to FIG. 10, the process starts in step 302 and continues to step 304, in which the input pixel values in the expanded bounding box for tile k are transferred to a memory in the DPTZ processor. Next, in step 306, inverse mapping is performed by calculating the coordinates of the pixels in tile k of the output image and their corresponding coordinates in the input image. While performing inverse mapping on tile k, the output pixel values are calculated for tile k+1 in step 308 by interpolating between pixels in the expanded bounding box for tile k+1 of the output image. In addition, in parallel with steps 306 and 308, the output pixel values for tile k+2 are filtered in step 310. Likewise, in step 312, the output pixel values for tile k+3 are stored in memory. If there are remaining tiles whose output pixel values have not been stored, as determined at decision step 314, the process returns to step 304 and repeats for any remaining tiles. Once the output pixel values have been calculated and stored for each tile, the process terminates. To increase throughput, the granularity of any of the discrete steps (e.g., steps 304, 306, 308, 310, 312) can be reduced by further pipelining each step.

Figure 11:
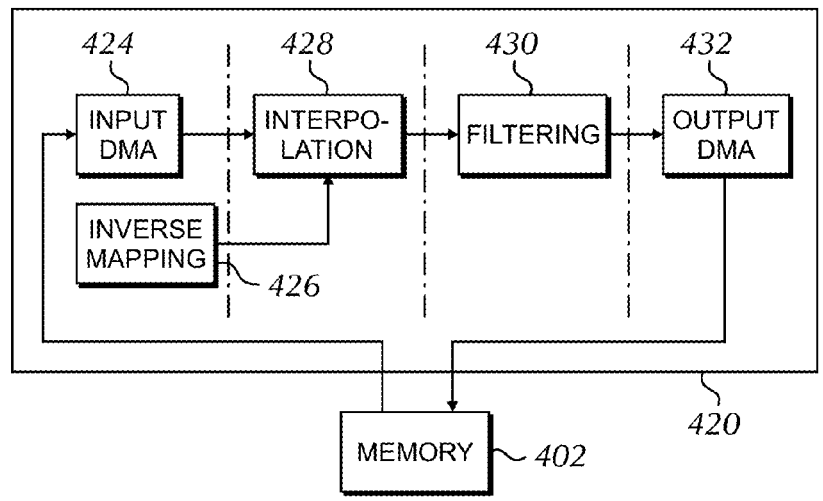
FIG. 11 is a simplified block diagram of one example of a DPTZ processor

FIG. 11 is a simplified block diagram of one example of the DPTZ processor 420 that may be used to execute the pipelining process described above. In this example the pixel values for the expanding bounding box for each tile are stored in direct memory access (DMA) circuits. The processor 420 includes an input DMA circuit 424, inverse mapping block 426, interpolation block 428, filtering block 430 and output DMA circuit 432. The input image is stored in memory 402 and transferred on a tile by tile basis to input DMA 424. The input DMA circuit 424 and inverse mapping block 426 execute their respective tasks on tile k, interpolation block 428 executes its task on tile k+1, the filtering block 430 executes its task on tile k+2 and output DMA circuit 432 executes its task on tile k+3. The final output image that is generated by processor 420 may also be stored in memory 402 or in a separate memory. The configuration and operation of the DPTZ processor 420 can be controlled by a separate processor. For example, the separate processor can handle the user input that defines the pan, tilt, and zoom parameters for the DPTZ processor 420.

The processes described above, including those shown in FIGS. 7 and 10, may be implemented in a general, multi-purpose or single purpose processor. Such a processor will execute instructions, either at the assembly, compiled or machine-level, to perform that process. Those instructions can be written by one of ordinary skill in the art following the description herein and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The invention claimed is:

1. A non-transitory computer-readable storage medium comprising stored instructions which, when executed by one or more processors, cause the one or more processors to perform a method for processing a lens-distorted image, the method comprising:
   for an output image corresponding to an undistorted rendition of a subset of the lens-distorted image, partitioning coordinate points in the output image into tiles;
   selecting coordinate points on a border of the tiles in the output image;
   for each tile, calculating coordinate points in the lens-distorted image corresponding to each selected coordinate point in the output image;
   for each tile, selecting a bounding box on the lens-distorted image that includes the calculated coordinates in the lens-distorted image;
   expanding the bounding boxes so that they encompass all coordinate points in the lens-distorted image that map to all coordinate points in their respective corresponding tiles; and
   generating output pixel values for each tile from pixel values in their corresponding expanded bounding boxes.

2. The computer-readable storage medium of claim 1, wherein the partitioning the output image into tiles is further dependent upon at least one item selected from the group consisting of available on-chip memory, memory controller burst size, and a complexity of a memory access pattern used to generate the output pixel values for each tile.

3. The computer-readable storage medium of claim 1, wherein selecting coordinate points on the border of the tiles comprises selecting corner points on the border of the tiles.

4. The computer-readable storage medium of claim 1, wherein selecting the bounding boxes comprises selecting maximum and minimum coordinates of the selected coordinate points for each tile in the output image.

5. The computer-readable storage medium of claim 1, wherein expanding the bounding boxes is further dependent upon at least one item selected from the group consisting of filter size used in image processing, available on-chip memory, memory controller burst size, a complexity of a memory access pattern used to fetch pixel values from memory, and a location of the bounding box with respect to a center of lens-distortion.

6. The computer-readable storage medium of claim 1, wherein the selected output image is selected in accordance with at least one received input pan, tilt, or zoom parameters.

7. The computer-readable storage medium of claim 1, wherein generating the output pixel values comprises:
- transferring pixel values from the lens-distorted image for tile K of the output image;
- calculating the coordinates of the pixels in the tile K of the output image within the coordinate system of the lens-distorted image;
- calculating output pixel values for tile K+1 of the output image by interpolating between pixels of the lens-distorted image for tile K+1; and
- filtering the output pixel values for tile K+2 of the output image.

8. The computer-readable storage medium of claim 7, wherein the transferring step, the calculating steps, and the filtering step are performed in parallel with one another.

9. The computer-readable storage medium of claim 7, wherein filtering the output pixel values comprises of vertical filtering and horizontal filtering steps for consecutive tile K of the output image.

10. The computer-readable storage medium of claim 7, wherein the pixel values comprise luminance and chrominance color channels.

11. A device comprising:
- a memory for storing digitized optical image data comprising a lens-distorted input image;
- a processor communicatively coupled to the memory, the processor transforming a selected portion of the lens-distorted input image to produce an undistorted output image, wherein the processor is configured to perform the transformation by dividing coordinates in the output image into a plurality of tiles;
- for each tile, calculating coordinate points in the lens-distorted input image corresponding to each selected coordinate point in the output image; and
- for each tile, selecting a bounding box on the lens-distorted input image that includes the calculated coordinates in the lens-distorted input image;
- wherein the processor is further configured to establish the bounding boxes by selecting coordinate points on a border of the tiles in the output image;
- and wherein the processor is further configured to expand the bounding boxes so that they encompass all coordinate points in the lens-distorted input image that map to all coordinate points in their respective corresponding tiles.

12. The device of claim 11 wherein the processor is further configured to generate output pixel values in accordance with a pipelining process in which different tasks are performed simultaneously on different ones of the tiles.

13. The device of claim 12 wherein the different tasks include transferring input pixel values in a bounding box to the processor, inverse mapping coordinates in each tile to coordinates in a corresponding one of the bounding boxes, and interpolating and filtering transferred output pixel values.

14. The device of claim 11 wherein the lens-distorted input image comprises lens distortion from a fisheye lens.

15. The device of claim 11 wherein the processor is further configured to select coordinate points on the border of the tiles by selecting corner coordinate points on the border of the tiles.

16. The device of claim 15 wherein the processor is further configured to select the bounding boxes by selecting maximum and minimum coordinates of the selected corner coordinate points for each tile in the output image.

17. The device of claim 11, wherein the processor is further configured to divide the coordinates in the output image into a plurality of tiles in a manner dependent upon at least one item selected from the group consisting of available on-chip memory, memory controller burst size, and a complexity of a memory access pattern used to generate the output pixel values for each tile.

18. The device of claim 11, wherein the processor is further configured to establish the bounding boxes in a manner dependent upon at least one item selected from the group consisting of filter size used in image processing, available on-chip memory, memory controller burst size, a complexity of a memory access pattern to fetch pixel values from memory, and a location of the bounding box with respect to a center of lens-distortion.

19. The device of claim 11 further comprising:
- an output memory, communicatively coupled to the processor, for storing the undistorted output image.

20. The computer-readable medium of claim 1, the method further comprising:
- storing the output image in an output memory communicatively coupled to the one or more processors.

* * * * *